United States Patent [19]
Bürge

[11] 4,069,062
[45] Jan. 17, 1978

[54] ADDITIVE FOR MORTAR AND CONCRETE

[75] Inventor: Theodor Bürge, Geroldswil, Switzerland

[73] Assignee: Sika AG, Vormals Kaspar Winkler & Co., Zurich, Switzerland

[21] Appl. No.: 736,423

[22] Filed: Oct. 28, 1976

Related U.S. Application Data

[60] Division of Ser. No. 636,930, Dec. 2, 1975, which is a continuation of Ser. No. 465,883, May 1, 1974, abandoned.

[30] Foreign Application Priority Data

May 8, 1973 Australia .............................. 4023/73

[51] Int. Cl.² .............................................. C04B 7/353
[52] U.S. Cl. ....................................... 106/93; 106/314; 260/29.65
[58] Field of Search ........................... 106/93, 314, 90; 260/29.65

[56] References Cited
U.S. PATENT DOCUMENTS 4,003,431  1/1977  Novotny et al. ...................... 106/314

*Primary Examiner*—J. Poer
*Attorney, Agent, or Firm*—Gordon W. Hueschen

[57] ABSTRACT

An additive for mortar and concrete composed of water-soluble, swellable polymeric substances, said water soluble, swellable polymeric substances being employed in a finely dispersed state in an aqueous solution of salt or organic solvents.

13 Claims, No Drawings

ADDITIVE FOR MORTAR AND CONCRETE

This is a division of application Ser. No. 636,930, filed Dec. 2, 1975 which in turn is a continuation of Ser. No. 465,883, filed May 1, 1974 now abandoned.

BACKGROUND OF THE INVENTION

The present invention relates to a new and improved additive for mortar and concrete in the form of aqueous dispersions.

Substances are already known to the art which improve the plasticity, the workability as well as the pumping properties of mortar and concrete. There are especially used derivatives of cellulose, such as methyl cellulose, hydroxyethyl cellulose, hydroxypropyl cellulose, carboxymethyl cellulose. Also there have already been utilized ethylene oxide polymers, polyvinyl alcohol, polyglycol, sulfonated melamine formaldehyde resins, polyacrylic amide and similar substances for such purpose.

What is disadvantageous is that all of the aforementioned products only can be utilized in a powder state. When using such products in powder form considerable difficulties arise since the substances are hygroscopic. The absorption of water from the air, which can amount to 45%, can bring about an adhesion or binding of the powder dosing installation. When using these substances in a dry state, there is additionally present the possibility of dust explosions. A further disadvantage resides in the fact that with the small additive quantities of about 50 grams per 2.5 tons concrete an exact dosing is associated with difficulties owing to the continuous absorption of water from the air.

The aforementioned swellable additive substances are water-soluble polymers which owing to hydration of their structural layers gradually transform into highly viscous solutions. Owing to this property of forming with water highly viscous solutions, wherein it should be mentioned that in 2% solutions there have been measured viscosities up to 100,000 centipoises (cps) and for practically employed additives there are required concentrations of at least 10% and viscosities under 200 cps, these additive agents cannot be employed as solutions.

SUMMARY OF THE INVENTION

It is a primary object of the present invention to produce liquid preparations of such additives which can be easily and surely dosed.

Now in order to implement this object and others which will become more readily apparent as the description proceeds, the invention contemplates producing aqueous dispersions of the swellable water-soluble substances, there being used as the dispersion agent a solution of salts or organic solvents, in which the substances are only partially soluble or insoluble.

The proposed solution to this problem is based upon the properties of such substances that they are insoluble in aqueous solutions of salts, such as NaCL, $Na_2SO_4$, $MgSO_4$, $Al_2(SO_4)_3$, $NaH_2PO_4$ and so forth, as well as solvents, such as alcohol, glycol and so forth. The solution suitable for the production of a stable dispersion, the concentration and the nature of the electrolyte which is to be employed and the further dissolved substances, must be determined for each additive or additive agent.

DETAILED DESCRIPTION OF THE INVENTION

Now in order to further understand the basic aspects of the invention, there will be considered hereinafter a number of examples for the production of the dispersions according to the invention. The dispersions are highly fluid i.e. low-viscosity, good workable liquids. They possess a viscosity around 200 cps and are stable when stored. They can be thus used without difficulty in all conventional dosing devices for mortar and concrete additives.

EXAMPLE 1

10 parts by weight hydroxyethyl cellulose are dispersed in 90 parts by weight of a 25% $Al_2(SO_4)_3$ solution. In order to stabilize the obtained dispersion, there can be further added 1 part by weight bentonite.

EXAMPLE 2

20 parts by weight ethylene oxide polymer are dispersed in 80 parts by weight of a 15% $Na_2SO_4$ solution and stabilized by the addition of 1 part by weight bentonite.

EXAMPLE 3

10 parts by weight hydroxypropyl cellulose are dispersed in 50 parts by weight propylene glycol and 40 parts by weight water. 1 part by weight bentonite is added for stabilization.

While there are described present preferred embodiments of the invention, it is to be distinctly understood that the invention is not limited thereto, but may be otherwise variously embodied and practiced within the scope of the following claims.

Accordingly, What is claimed is:

1. In a process for improving mortar or concrete in which a water-soluble, swellable polymeric substance is incorporated into the mortar or concrete in order to increase the viscosity thereof, the improvement which comprises separately preparing an aqueous dispersion in which the unswollen, water-soluble, swellable polymeric substance is finely dispersed in an aqueous solution of a water-soluble salt or an organic solvent in which said substance is only partially soluble or insoluble, wherein the salt or organic solvent serves to prevent dissolution and swelling of the polymeric substance, said separately prepared aqueous dispersion having a low viscosity and being storage stable, and as needed mixing this separately prepared storage stable, low-viscosity dispersion into the mortar or concrete where the water-soluble, swellable polymeric substance is freed to swell and thereby increase the viscosity of the mortar or concrete.

2. A process according to claim 1, wherein the water-soluble, swellable polymeric substance is a cellulose derivative.

3. A process according to claim 2, wherein said cellulose derivative is a member selected from the group comprising methyl cellulose, hydroxyethyl cellulose and hydroxypropyl cellulose.

4. A process of claim 1, wherein said water-soluble, swellable polymeric substance is polyvinyl alcohol.

5. A process of claim 1, wherein the water-soluble, swellable polymeric substance is polyglycol.

6. A process of claim 1, wherein the water-soluble, swellable polymeric substance is an ethylene oxide polymer.

7. A process of claim 1, wherein the water-soluble, swellable polymeric substance is sulfonated melamine formaldehyde resin.

8. A process of claim 1, wherein the water-soluble, swellable polymeric substance is polyacrylic amide.

9. In a process for improving mortar or concrete in which a water-soluble, swellable polymeric substance is incorporated into the mortar or concrete in order to increase the viscosity thereof, the improvement which comprises separately preparing a storage stable, low viscosity, liquid additive for mortar and concrete composed of a water-soluble, swellable polymeric substance which is finely dispersed in its non-swollen condition in an aqueous solution consisting predominantly of water and an inorganic water-soluble salt, said salt being present in an amount sufficient to prevent dissolution and swelling of the polymeric substance, said additive containing at least about 10 percent of said polymeric substance and having a viscosity under about 200 centipoises and being further characterized by not thickening up substantially on storage and by thickening up to a highly viscous solution upon being diluted with water to a polymeric substance concentration of about 2 percent, and as needed mixing this separately prepared storage stable, low-viscosity dispersion into the mortar or concrete where the water-soluble, swellable polymeric substance is freed to swell and thereby increase the viscosity of the mortar or concrete.

10. A process of claim 9, wherein the water-soluble, swellable polymeric substance is non-ionic.

11. In a process for improving mortar or concrete in which a water-soluble, swellable polymeric substance is incorporated into the mortar or concrete in order to increase the viscosity thereof, the improvement which comprises separately preparing a storage stable, low viscosity, liquid additive for mortar and concrete composed of a water-soluble, swellable polymeric substance which is finely dispersed in its non-swollen condition in an aqueous solution containing sufficient of an inorganic water-soluble salt or an organic solvent in which the polymeric substance is at most only partially soluble to prevent dissolution and swelling of the polymeric substance, said additive containing at least ten percent of said polymeric substance and having a viscosity under about 200 centipoises and being further characterized by not thickening up substantially on storage and by thickening up to highly viscous solution on being diluted with water to a polymeric substance concentration of about 2 percent, wherein the dispersion contains a minor amount of bentonite which is sufficient to stabilize the dispersion, and as needed mixing this separately prepared storage stable, low-viscosiy dispersion into the mortar or concrete where the water-soluble, swellable polymeric substance is freed to swell and thereby increase the viscosity of the mortar or concrete.

12. A process of claim 1, wherein the amount of said aqueous dispersion mixed with the mortar or concrete is in the order of 20 grams per ton.

13. A process of claim 9, wherein the amount of said aqueous dispersion mixed with the mortar or concrete is in the order of 20 grams per ton.

* * * * *

UNITED STATES PATENT OFFICE
CERTIFICATE OF CORRECTION

Patent No. 4,069,062           Dated Jan. 17, 1978

Inventor(s) Theodor Burge

It is certified that error appears in the above-identified patent and that said Letters Patent are hereby corrected as shown below:

Foreign Application Priority Data: "[30] Australia" should read --[30] Austria--

Col. 2, line 16: "$A;_2(SO_4)_3$" should read --$Al_2(SO_4)_3$--

Signed and Sealed this

Thirteenth Day of June 1978

[SEAL]

Attest:

RUTH C. MASON
*Attesting Officer*

DONALD W. BANNER
*Commissioner of Patents and Trademarks*